Feb. 15, 1966  M. B. HOLLANDER  3,234,644
FRICTION WELDING
Filed Aug. 28, 1963
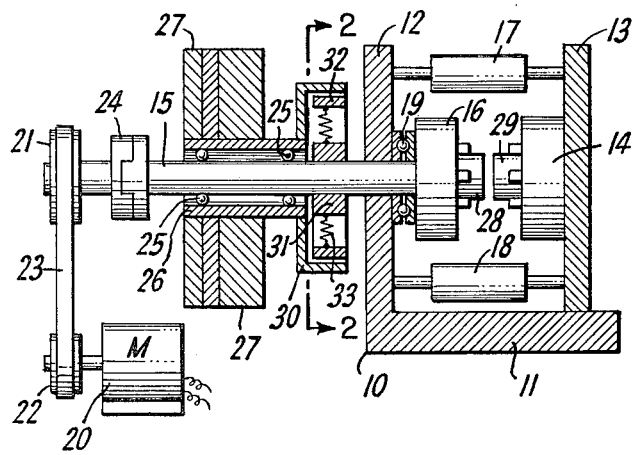
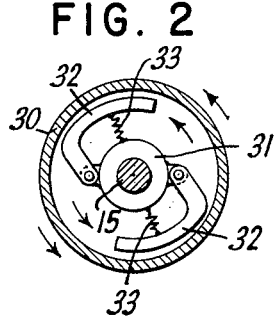
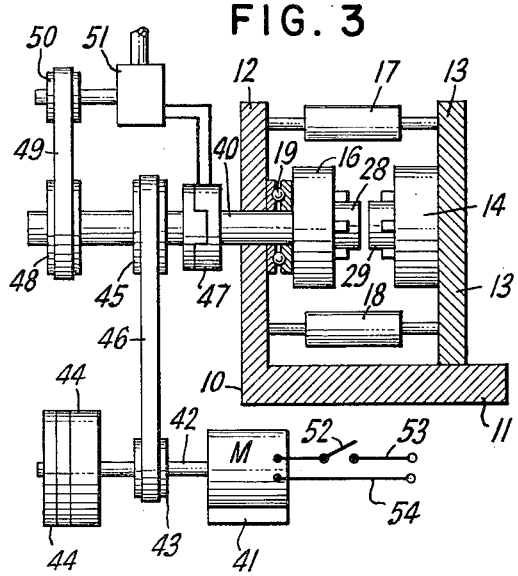
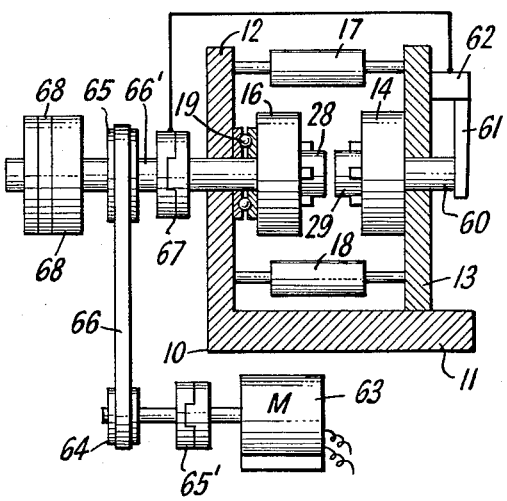
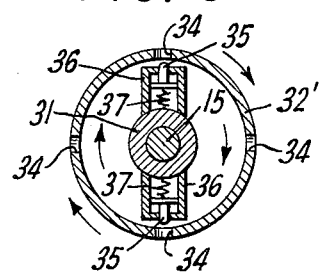
INVENTOR
MILTON BERNARD HOLLANDER
BY
ATTORNEY United States Patent Office 3,234,644
Patented Feb. 15, 1966

3,234,644
FRICTION WELDING
Milton Bernard Hollander, Stamford, Conn., assignor to American Machine & Foundry Company, a corporation of New Jersey
Filed Aug. 28, 1963, Ser. No. 305,170
5 Claims. (Cl. 29—470.3)

This application is a continuation-in-part of pending patent applications Serial No. 833,339, now Patent No. 3,134,278 and Serial No. 206,714.

This invention relates in general to welding apparatus, and, more particularly, to friction welding apparatus.

Friction welds have been made by first setting into rotation a first workpiece and a coupled inertial mass, such as flywheel, to store a predetermined quantity of kinetic energy, and then converting this energy into frictional welding heat by forcing together the first rotating workpiece and a stationary second workpiece so that the energy stored within the rotating workpiece and the flywheel is expended between the workpieces to render their surfaces plastic or molten. As the energy in the flywheel and the rotating workpiece is discharged, the rotating workpiece and the flywheel come to a stop and the friction weld is completed.

Electric motors, such as those which are commonly used in power shop equipment, deliver relatively little power when they are at rest or near zero r.p.m. In a friction welding apparatus of the kind just described, the relatively massive flywheel, which includes all the rotating elements other than the rotating workpiece itself, is brought to a stop after the completion of each weld. At the start of the next welding cycle, this relatively massive flywheel mass must be accelerated from rest by the motor driving the apparatus.

It is, therefore, an object of this invention to provide a flywheel powered friction welding apparatus and method in which the total energy within the flywheel is not discharged in the completion of a weld.

Another object of this invention is to provide a flywheel friction welding apparatus and method in which the flywheel need not be brought to rest during or between welding cycles.

Still another object of this invention is to provide in an inertial friction welding machine means to disengage a rotating workpiece from a flywheel before the energy of the flywheel is completely exhausted.

A further object of this invention is to provide an inertially powered friction welding apparatus and method which will not fracture workpieces which seize or are welded together while energy remains in the flywheel.

Many other objects, advantages and features of the invention reside in the particular construction, combination and arrangement of parts involved in the embodiments of the invention and its practice as will be understood from the following description and accompanying drawing wherein:

FIG. 1 is a longitudinal vertical section through a friction welding apparatus constructed according to a first embodiment of this invention;

FIG. 2 is a transverse vertical section taken on line 2—2 of FIG. 1, showing the clutch construction;

FIG. 3 is a longitudinal vertical section through a friction welding apparatus constructed according to a second embodiment of this invention;

FIG. 4 is a longitudinal vertical section through a friction welding apparatus constructed according to a third embodiment of this invention; and FIG. 5 is a transverse vertical section through a positively engaging centrifugal clutch which may be used in place of the clutch shown in FIG. 2.

Referring to the drawing in detail, FIG. 1 shows a friction welding apparatus having a frame member 10 forming a base portion 11 and a vertical end member 12. Slidably mounted on the base 11 is a second vertical end member 13 which has a stationary chuck 14 mounted on it. A rotatably mounted shaft 15 extends through the vertical end member 12 and mounts a rotating chuck 16. A pair of pneumatic or hydraulic cylinders 17 and 18 are connected between the vertical end members 12 and 13 to draw the slidably mounted member 13 towards the member 12 when the cylinders 17 and 18 are activated. A heavy duty thrust bearing 19 is interposed between the chuck 16 and the end member 12.

A motor 20 drives a shaft 15 by pulleys 21 and 22 and a belt 23. If desired, as will be later explained, the motor 20 may drive the shaft 15 through a clutch 24. Rotatably mounted on the shaft 15 by bearings 25 is a sleeve shaft 26. Mounted on the sleeve 26 are flywheel weights or masses 27 which may be removed or added according to the amount of energy required to weld two given workpieces 28 and 29 for a given relative angular speed. The workpieces are fixed in the chucks 16 and 14. Fixed to one end of sleeve 26 is the drum 30 which surrounds a collar 31 fixed to shaft 15. Referring also to FIG. 2, it may be seen that centrifugal clutch elements 32 are pivotally attached to the collar 31. Tension springs 33 urge the centrifugal clutch elements 32 inward.

The first embodiment of this invention is operated in the following manner. Workpieces 28 and 29, which are to be friction welded, are secured in the chucks 16 and 14. The motor 20 is started to rotate shaft 15 and thereby collar 31 and the centrifugal clutch elements 32. As the rotation of clutch elements 32 accelerates, centrifugal force urges them outward against the restraint of springs 33 until the clutch elements 32 frictionally engage drum 30. When motor 20 is first started, shaft 15 rotates within the stationary sleeve 26 which remains at rest due to the inertia of the flywheel elements 27. As the centrifugal clutch elements 32 engage drum 30, motor 20 rotates the flywheel elements 27 and chuck 16 together to bring them up to a desired welding speed for a given pair of metal workpieces. The cylinders 17 and 18 are then activated to force the relatively rotating workpieces 28 and 29 together. Depending upon the type of motor 20 which is used, a clutch 24 may be provided to disengage the motor 20 during the actual welding cycle. The flywheel elements 27 deliver energy to the weld area and, as energy is delivered and converted into welding heat, they rapidly slow down. As the flywheel elements 27, the drum 30, and the centrifugal clutch elements 32 slow down, the springs 33 draw the centrifugal clutch elements 32 inward to disengage the flywheel elements 27 from the shaft 15. The much smaller mass of the chuck 16 and shaft 15 are then rapidly brought to a stop, for example by a brake, as the weld between workpieces 28 and 29 is completed. The flywheel elements 27, sleeve 26, and drum 32 continue to rotate about shaft 15.

When the welded workpieces 28 and 29 are removed from chucks 16 and 14, cylinders 17 and 18 are actuated to move the chucks 16 and 14 apart. New workpieces 28 and 29 to be welded are again secured in the chucks 16 and 14. Motor 20 is again started or connected to shaft 15 by means of clutch 24 to drive chuck 16 and the centrifugal clutch elements 32. As the shaft 15 is accelerated, the centrifugal clutch elements 32 again fly outward against the restraint of springs 33 to couple the flywheel elements 27 to shaft 15 and chuck 16 to store sufficient additional energy of rotation to make another weld.

When an electric motor 20 is used which should not be stalled during the completion of a weld cycle, the clutch 24 is provided to disengage motor 20 from shaft 15. If an air motor or the like is used which may be stalled without resulting harm, the clutch 24 need not be provided.

As shown in FIG. 5, a positive locking type of centrifugal clutch may be provided to link the flywheel elements to shaft 15. As one example of such a clutch, a drum 32', corresponding to drum 32, has the plurality of apertures 34 formed in it. Plungers 35 are radially mounted within the housings 36 and constrained inwardly by the springs 37. As shaft 15 and collar 31 rotate the housings 36 at a desired speed, centrifugal force will urge the plungers 35 outward to engage the apertures 34 and drive the drum 32'.

Referring now to FIG. 3, the friction welding apparatus according to the second embodiment of this invention has a frame member 10 forming a base 11 and a vertical end member 12. The vertical end member 13 has the chuck 14 secured to it and may be urged toward the end member 12 by means of the hydraulic or pneumatic cylinders 17 and 18 connected between the end members. A rotatable chuck 16 is mounted on a shaft 40 which extends through the end member 12. Motor 41 drives shaft 42 on which are mounted the pulley 43 and the flywheel weights 44. Pulley 43 drives a shaft 40 by pulley 45, which is mounted on shaft 40 and coupled to pulley 43 by a belt 46. Pulley 45 drives shaft 40 through the clutch 47 which may be any standard type of clutch, such as a pneumatically, electrically, mechanically, or hydraulically activated clutch. A pulley 48 drives a belt 49 which rotates a pulley 50 mounted on the shaft of a control element 51. If the clutch 47 were an electrical clutch, control element 51 could be a centrifugal electric switch connected between a current source and clutch 47.

The second embodiment of this invention is operated in the following manner. Control element 51 is set to engage clutch 47 only after pulley 45 and the part of shaft 40 on which it is mounted reach a desired speed. Thus motor 41 is started by closing switch 52 so that the leads 53 and 54 may supply current to motor 41. As motor 41 accelerates the flywheel weights 44 and speeds up the rotation of pulley 48, control element 51 engages clutch 47 so that motor 41 drives shaft 40 to rotate chuck 16. When chuck 16 and the flywheel elements 44 are rotating at a desired speed, the cylinders 17 and 18 are activated to force the workpieces 28 and 29 together. Switch 52 should be opened before starting the weld so that the flywheel elements 44 and motor 41 will lose inertia during the making of the weld. As kinetic energy is discharged from the rotating flywheel elements 44, shaft 40, and chuck 16 into the weld area, shaft 40 rapidly slows down and, at a predetermined speed of rotation, control element 51 disengages clutch 47. The partially made weld rapidly stops the relative rotation of chucks 16 and 14 so that the weld is almost immediately completed. Cylinders 17 and 18 may be activated to urge chuck 14 away from chuck 16 so that the welded workpieces may be removed and a second pair of workpieces to be welded may be placed in the chucks 14 and 16. When motor 41 is again activated by closing switch 52, it is still rotating with the flywheel elements 44 so that it need not accelerate from rest. As pulleys 48 and 50 again come up to a desired speed, control element 51 again engages clutch 47 to rotate chuck 16.

If clutch 47 were a pneumatic or a hydraulic clutch, control element 51 could be a centrifugally activated valve. If clutch 47 were mechanically activated, control element 51 could be a centrifugally activated device, such as the well known fly ball governor, which could, through a mechanical linkage, activate clutch 47. A control element 51 would not be needed if clutch 47 were a centrifugal clutch similar to that shown in FIG. 2.

FIG. 4 shows a friction welding apparatus generally similar to that shown in FIG. 3. Chuck 14 is mounted on a short shaft 60 which is held from rotating by an arm 61 coupled to a torque measuring device 62. Motor 63 drives pulley 64 (through a clutch 65', if desired). Pulley 64 drives pulley 65 by belt 66. Pulley 65 is mounted on shaft 66 which drives chuck 16 through clutch 67. The flywheel elements or weights 68 are mounted on shaft 66.

The third embodiment of this invention is operated in the following manner. Motor 63 drives shaft 66' and chuck 16 through clutch 67. When the flywheel 68 and chuck 16 are rotating at a desired speed, clutch 65' may be disengaged and cylinders 17 and 18 activated to force the relatively rotating workpieces 28 and 29 together. Torque between the relatively rotating workpieces increases as the weld is made in many cases. When this torque reaches a desired value and the flywheel elements 68, shaft 66' and chuck 16 are still rotating at a desired speed, the torque measuring device 62 disengages clutch 67. The weld will then be rapidly completed without the torque between the workpieces reaching an undesirably high level which, in some cases when metal workpieces are being welded, will rupture the weld. After the cylinders 17 and 18 are extended, and new workpieces 28 and 29 are placed in the chucks 16 and 14, and clutch 65' is engaged, as well as clutch 67, the motor 63 can charge the flywheel elements 68 by bringing them and chuck 16 to a desired speed.

All the embodiments of this invention enjoy many advantages. For example, all the energy stored in the flywheel elements 27, 44 or 68 is not discharged into the weld. Thus it is relatively easier for motor 20 to accelerate the flywheel elements from a low speed to a high speed than it would be to accelerate the flywheel elements from a position of rest. This advantage enables a production machine made according to this invention to achieve a higher rate of output with a given drive motor. Further, since the flywheel elements are disconnected from the rotating workpiece at the end of the actual weld time, excessive torque build up may be eliminated at the end of a weld cycle. As has been pointed out, excessive torque after seizure of the workpieces may cause them to fracture.

While this invention has been described in the best forms known, it will nevertheless be understood that these are purely exemplary and that modifications may be made without departing from the scope of the invention as defined in the appended claims.

What is claimed is:
1. The method of friction welding two workpieces comprising the steps of coupling together an inertial mass, a clutch therefor and a workpiece holding chuck to a drive means; and rotating one of the workpieces driven by said inertial mass relative to the other workpiece, forcing the workpieces together to generate weld heat in the area of contact as the kinetic energy of the inertial mass is discharged, and disconnecting the rotating inertial mass from the rotating chuck at a predetermined speed of rotation as the weld is completed.

2. A friction welding apparatus comprising, in combination, a stationary workpiece chuck, a rotatable workpiece chuck, means to urge said chucks toward each other during a weld cycle, a motor for rotating said rotatable chuck, a flywheel mass coupled to and rotatable with said rotatable chuck, and clutch means for disconnecting said flywheel mass from said rotatable chuck after discharging a predetermined amount of energy from the inertial mass before the completion of a weld cycle.

3. The combination according to claim 2 wherein said clutch means is a centrifugal clutch coupling the flywheel to its associated workpiece.

4. A friction welding apparatus comprising, in combination, a stationary workpiece chuck, a rotatable workpiece chuck, means to urge said chucks toward each other during a weld cycle, means driving said rotatable chuck, a rotatably mounted flywheel mass coupled to and rotatable with said rotatable chuck, clutch means coupling said flywheel mass to said rotatable chuck and means responsive to the speed of rotation of said rotatable chuck for engaging and disengaging said clutch.

5. An inertia friction welding apparatus comprising, in combination, a stationary workpiece chuck, a rotatably mounted shaft, a second workpiece chuck mounted on said shaft, means to urge said chucks toward each other during a weld cycle, motor means driving said shaft, flywheel weights mounted to rotate about said shaft, centrifugal clutch elements attached to said shaft, means restraining the outward motion of said centrifugal clutch elements, and a drum mounting said flywheel weights and surrounding said centrifugal clutch elements, said means restraining the outward motion of said centrifugal clutch elements disengaging said centrifugal clutch elements from said drum below a predetermined speed.

References Cited by the Examiner
UNITED STATES PATENTS

| | | | |
|---|---|---|---|
| 2,463,907 | 3/1949 | Risley et al. | 29—493 XR |
| 2,699,293 | 1/1955 | Svendsen | 74—572 XR |
| 3,134,278 | 5/1964 | Hollander et al. | 29—470.3 XR |

OTHER REFERENCES

Zvaranie VI/4—1957, pages 105–109.
Zvaranie VI/11—1957, pages 327—329.
Zvaracsky Sbornik, Sav. VI, 3-Bratislava, 1957, pages 327–347.

JOHN F. CAMPBELL, *Primary Examiner.*